July 2, 1935.   J. R. CHAMBERLAIN   2,006,439
SHACKLE DEVICE
Filed May 28, 1930
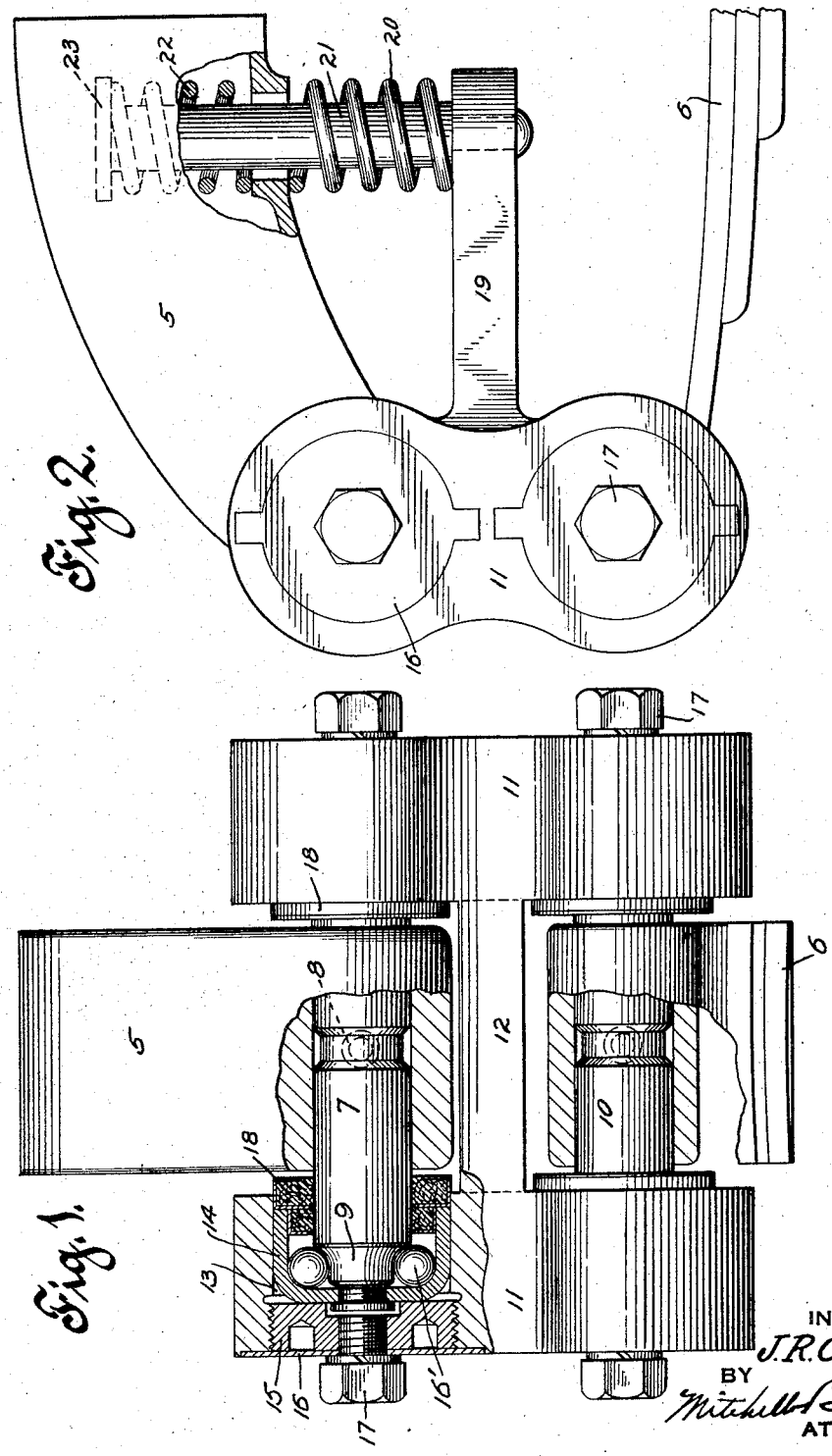
INVENTOR
J.R. Chamberlain
BY
Mitchell Eichut
ATTORNEYS Patented July 2, 1935

2,006,439

UNITED STATES PATENT OFFICE 2,006,439

SHACKLE DEVICE

James R. Chamberlain, New Britain, Conn., assignor to The Fafnir Bearing Company, New Britain, Conn., a corporation of Connecticut Application May 28, 1930, Serial No. 456,515

3 Claims. (Cl. 267—54)

My invention relates to means for preventing so-called "shimmying" of a motor vehicle.

It is well known that there is often a tendency of the front wheels of an automobile to wobble or oscillate, which movement is usually termed "shimmying". It has been found that the tendency to shimmy is reduced or eliminated if both ends of the front spring on the driving side of the automobile are shackled to the frame and the fore and aft rocking or shackling movement of one of the shackles is resiliently resisted. Various methods of resiliently resisting the shackling movement a shackle at one end of the spring have been proposed, but there are certain disadvantages to those now in use. For example, some of the known devices project beyond the shackle and beyond the end of the spring or transversely of the spring, so as to either reduce ground clearance or present an unsightly appearance.

It is the principal object of the present invention to provide an improved, resiliently held shackle device, which will not be unsightly and which will not substantially reduce ground clearance.

It is another object to provide a resiliently held shackle device, which is relatively simple in construction and effective in operation.

Other objects will appear as the description proceeds.

Briefly stated, in a preferred form of the invention I employ a shackle of suitable construction for connecting the frame and front spring of an automobile on the driving side. The shackle carries an arm or projection which is suitably held and resiliently holds the shackle in normal operating position. The arm preferably lies between the frame and spring so that ground clearance is not reduced, nor are there any dangerous unsightly or cumbersome projections extending beyond the end of the spring or the frame end. Anti-friction bearing members may be embodied in the shackle to reduce friction, prevent squeaks and rattles, and provide for general smoothness of operation.

In the drawing which shows, for illustrative purposes only, a preferred form of the invention—

Fig. 1 is an end view in partial section of a shackle device embodying the invention and showing fragments of a spring and frame;

Fig. 2 is a side view of the shackle device and associated parts of Fig. 1.

The device is illustrated as applied to the front end of the left front spring of a left-hand drive automobile. 5 indicates part of the frame of a motor vehicle, while 6 indicates a spring. The rear end of the spring (not shown) is shackled to the frame 5 so as to permit the rear end to move freely during flexing of the spring. The forward end of the spring 6 is connected to the frame 5 by a resiliently held shackle device which extends upwardly from the spring end to the frame so that as the spring 6 is flexed the shackle will have a fore and aft oscillating movement.

In the form illustrated I employ a ball bearing spring shackle. In this form the frame 5 is provided with a pin 7 securely held in an eye of the frame, as by means of a drive fit and optionally by means of a set screw or the like 8 taking into the central tapered groove of the pin 7. The ends of the pin 7 project beyond the sides of the frame 5 and in the form illustrated are provided with raceways such as 9, formed directly thereon. The spring 6 is provided with a pin 10, which may be and preferably is in all substantial respects the same as the pin 7 and may be held in the spring eye, as heretofore noted in connection with the pin 7.

The shackle includes side links 11—11, connected to each other by suitable means. In the illustrated form the links 11—11 are integral with a securing and spacing member 12 extending therebetween. Each link, at spaced points, is provided with seats, as 13, for receiving antifriction bearing raceway members, such as bearing cups 14, which may be held in place, as by means of screw plugs 15. Such plugs, if desired, may be locked by means of a locking plate 16 and cap screw 17. Antifriction bearing members, such as balls 16', are interposed between the bearing raceway members 14 and the raceways 9 on the bearing pins 7 and 10. Suitable closure rings 18 may be provided for excluding dust and retaining lubricant on the antifriction bearing members and their respective raceways. When an integral type of shackle as here illustrated is employed, assembly will be facilitated by providing each side link at the bearing portions thereof with assembling notches as disclosed in Smith Patent No. 1,594,476, August 3, 1926.

The shackle is provided with an arm or projection 19, which, in the form shown, is integral therewith. The arm 19 extends in a direction so as to lie in a generally horizontal plane between the frame 5 and spring 6, so as to be in effect concealed between the frame and spring, so that the shackle device does not present an unsightly appearance, nor is the ground clearance decreased by the arm 19 or any part cooperating therewith. The shackle is resiliently held in normal position by suitable spring means and, in the form illustrated, I employ a spring 20 surrounding a pin 21 carried by the arm 19. The spring 20 is interposed between the frame 5 and the arm 19. A second spring 22 is interposed between a head 23 on the pin 21 and the frame 5, so as to act against the spring 20, whereby the two springs together normally hold the arm 19 and shackle device in normal operating position, which may be considered substantially the position shown in Fig. 2.

Thus, when the car is driven, the shackle on the end of the spring opposite that shown may oscillate or shackle freely, while oscillating movement of the shackle 11—11 is resiliently resisted by the spring means, as shown. The resistance of the springs 20—22 is so determined that the shackle 11—11 may oscillate to a limited extent and against the resistance of one or the other of the springs, such oscillation being sufficient in extent to either materially reduce or entirely eliminate the tendency of the car to shimmy.

The invention has been illustrated in connection with a ball bearing spring shackle. It is to be understood, however, that the invention is of broader application and may be embodied in a plain bearing or other type of shackle. It is also to be understood that the invention is in no sense limited to a shackle in which the side links are integral with each other, and that various other changes, modifications, additions and omissions may be made within the scope of the invention as defined in the appended claims.

I claim:

1. In a device of the character indicated, a frame, a spring, a pin carried by said frame and projecting beyond the sides thereof, a pin carried by said spring and having ends projecting beyond the sides thereof, a shackle comprising side members, antifriction bearing member raceway members carried by said side members, antifriction bearing members interposed between said raceway members and said pin ends, said shackle side members having a part integral therewith for securing the same together in definite relationship, an arm integral with said shackle and extending from one side only of said shackle at a point between said frame and spring, a compression spring for resisting upward movement of said arm and rearward movement of said shackle, and a compression spring for resisting downward movement of said arm and forward movement of said shackle, for the purpose described.

2. In a device of the character indicated, a shackle means including two side links, means for rigidly connecting said links to each other, bearing means to be carried by a frame and spring, antifriction bearing members interposed between said bearing means and said side links, an arm rigidly carried by the means for rigidly connecting said side links, said arm extending in a generally horizontal direction to lie between the frame and spring, and means for resiliently resisting up and down movement of said arm and fore and aft movement of said shackle.

3. In a device of the character indicated, a shackle including side links, bearing means to be carried by a frame and spring, antifriction bearing members interposed between said bearing means and said side links, and means wholly at one side of said shackle for resiliently resisting fore and aft movement of said shackle, said means including an arm projecting rigidly from a part of said shackle between its ends and extending in a generally horizontal direction.

JAMES R. CHAMBERLAIN.